US006533342B2

(12) United States Patent
Auer et al.

(10) Patent No.: US 6,533,342 B2
(45) Date of Patent: Mar. 18, 2003

(54) ACTUATING ARRANGEMENT FOR OPENING AND CLOSING HINGED MOTOR VEHICLE PANELS

(75) Inventors: Wolfgang Auer, Nagold (DE); Ralf Hess, Herrenberg (DE); Jürgen Moczygemba, Wannweil (DE); Kurt Schaible, Aidlingen-Dachtel (DE); Roland Scheurenbrand, Gäufelden (DE); Wolfgang Schneider, Calw (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/853,084

(22) Filed: May 11, 2001

(65) Prior Publication Data

US 2002/0033613 A1 Mar. 21, 2002

(30) Foreign Application Priority Data

May 12, 2000 (DE) ........................................ 100 23 274

(51) Int. Cl.[7] ................................................ B62D 25/12
(52) U.S. Cl. ............................................ 296/76; 49/339
(58) Field of Search ....................... 296/37.1, 56, 146.4, 296/76; 49/360, 339, 340, 352

(56) References Cited

U.S. PATENT DOCUMENTS 5,563,483 A * 10/1996 Kowall et al. .............. 318/266
5,788,312 A * 8/1998 Lee ............................. 296/76
5,982,126 A * 11/1999 Hellinga et al. ............ 318/286
5,986,420 A * 11/1999 Kato ............................. 318/1
6,150,781 A * 11/2000 Hollerbach ............ 296/107.01
6,283,530 B1 * 9/2001 Hollerbach .................. 296/76
6,398,288 B1 * 6/2002 Yuge ....................... 296/146.4

FOREIGN PATENT DOCUMENTS

| | | |
|---|---|---|
| DE | 40 07 162 A1 | 9/1991 |
| DE | 196 49 698 A1 | 10/1997 |
| DE | 198 36 310 A1 | 3/2000 |

* cited by examiner

*Primary Examiner*—D. Glenn Dayoan
*Assistant Examiner*—Jason Morrow
(74) *Attorney, Agent, or Firm*—Crowell & Moring LLP

(57) ABSTRACT

An actuating arrangement for opening and closing a hinged motor vehicle panel has a fluid drive, a control unit, and a sensor unit. The hinged motor vehicle panel is movable between a starting position and an end position, and the control unit evaluates start signals from the sensor unit and stopping the movement of the motor vehicle panel in an intermediate position. The start signals from the sensor unit correspond to current angles of opening of the hinged motor vehicle panel, and predetermined angles of opening of the hinged motor vehicle panel define certain criteria. It is possible to set at least the angle of opening of the intermediate position via the control unit.

22 Claims, 4 Drawing Sheets

ACTUATING ARRANGEMENT FOR OPENING AND CLOSING HINGED MOTOR VEHICLE PANELS

This application claims the priority of German application 100 23 274.4, filed May 12, 2000, the disclosure of which is expressly incorporated by reference herein.

BACKGROUND AND SUMMARY OF THE INVENTION

The present invention relates to an actuating arrangement for opening and closing a hinged motor vehicle panel including a fluid drive, a control unit, and a sensor unit. The hinged motor vehicle panel is movable between a starting position and an end position. The control unit evaluates start signals from the sensor unit and stops movement of the motor vehicle panel in an intermediate position when certain criteria are met.

In such actuating arrangements, hinged motor vehicle panels, such as flaps, lids, bonnets and doors, are automatically opened and closed as required by drive mechanisms.

German publication DE 40 07 162 A1 discloses an actuating arrangement for opening and closing a hinged motor vehicle panel having a fluid drive controlled by a control unit, an uncontrolled fluid drive, and a sensor device. The hinged motor vehicle panel is driven from a starting position into an end position by the controlled fluid drive and the uncontrolled fluid drive. The sensor device includes a motor speed sensor which detects the motor speed of an electric motor driving the hydraulic pump. In the event of a drop in motor speed of the electric motor, caused by an obstruction, during opening or closing, the control device either switches off the movement procedure or reverses the direction of movement.

This actuating arrangement eliminates known disadvantages of manually performed hinged tailgate opening and closing procedures; such disadvantages include, for example, substantial expenditure of effort and difficulty of reach when the tailgate is in its highest position.

It is an object of the invention to provide an actuating arrangement for opening and closing motor vehicle panels that can be adapted to various operating conditions and/or to individual user requirements.

This object is achieved, according to the invention, by having the start signals from the sensor unit correspond to current angles of opening of the hinged motor vehicle panel, by defining at least one intermediate position of the hinged motor vehicle panel, during a closing or opening movement, as a predetermined angle of opening, and by having the predetermined angle of opening be storable and individually programmable. Advantageous embodiments and refinements of the invention are reflected in certain claims.

A primary feature of the invention is that possible intermediate positions during a closing or opening movement of a motor vehicle panel are defined by predetermined opening angles. At least one angle of opening is settable via a control unit.

As a result, it is possible to adapt the possible range of movement of the motor vehicle panel to structural conditions of the motor vehicle tail region or to individual user requirements so that, for example, the maximum angle of opening of the motor vehicle panel can be set simply.

The predetermined angles of opening are preferably stored in the control unit and may be either set permanently by the vehicle manufacturer during production or freely settable.

One advantageous feature of the invention is that at least one angle of opening can be programmed by the user. This increases convenience in the use of the actuating arrangement.

Another advantageous feature of the invention is that the current angle of opening between the starting position and the end position is detected by a swing angle sensor which passes a corresponding start signal to the control unit.

The current angle of opening of the hinged motor vehicle panel can be determined very accurately by a swing angle sensor.

Another particularly advantageous feature is that a current angle of opening of the motor vehicle panel is detected via the position of a drive lever by the swing angle sensor. The drive lever transmits the actuating force of the fluid drive, via a connection fixed in rotation, to a lever of the hinge of the motor vehicle panel. This enables the swing angle sensor to be fitted in a protected and compact position.

Preferably, the fluid drive comprises a controlled fluid drive with a hydraulic group and a hydraulic cylinder. The working direction and the switch-on and switch-off times of the controlled fluid drive are determined by the control unit as a function of the evaluation of the current angle of opening.

Another particularly advantageous feature is that the sensor device is additionally used to provide anti-jamming and anti-overload protection when encountering an obstacle. To this end, the control unit evaluates a current change in the angle of opening in relation to the normal change in the angle of opening. The normal change in the angle of opening is dependent on the duration of the opening or closing movement.

If no change in the angle of opening is detected within a predetermined time window, because the motor vehicle panel has encountered an obstacle, the opening or closing movement is stopped.

In addition, after stopping, the direction of movement of the motor vehicle panel can be reversed. Reverse movement of the motor vehicle panel is stopped after the original starting position is reached.

The measures described make it possible to dispense with an additional sensor for anti-jamming and anti-overload protection.

The user triggers an opening or closing movement by actuating operating elements, and the movement sequence can be stopped at any time by further actuation by the user. The opening or closing operation is subject to monitoring of the control unit in conjunction with the sensor unit, as described. The actuating elements for triggering the opening or closing operation may be disposed, for example, in the passenger compartment, on the tailgate, or on a portable remote control.

In addition, the opening or closing operation may also be triggered automatically. The automatic triggering of an opening operation takes place when a keyless go card is detected within the luggage compartment while the tailgate is being closed. The keyless go card is used for keyless access and keyless operation of the motor vehicle.

The invention is described in detail below with reference to the drawings.

DETAILED DESCRIPTION OF THE DRAWING FIGURES

Figure 1:
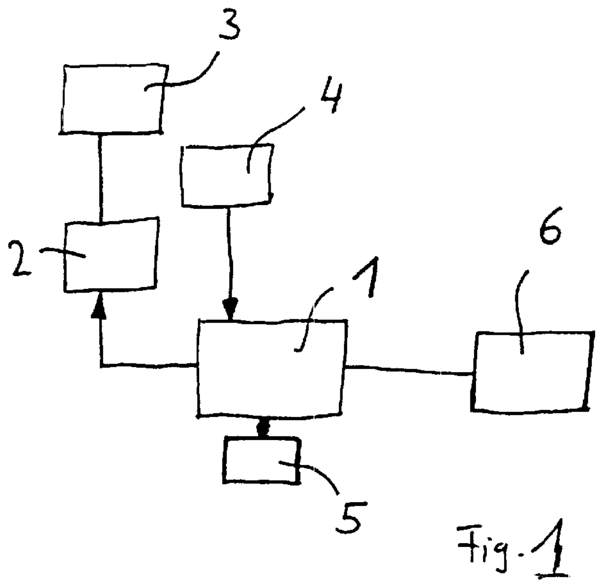
FIG. 1 is a block circuit diagram of the actuating arrangement.

FIG. 1 shows the actuating arrangement for opening and closing hinged motor vehicle panels 3 as comprising a control unit 1, a fluid drive 2, which, for example, includes a controlled fluid drive 2.1, 2.2 and an uncontrolled fluid drive 2.3, 2.4, a sensor unit 4, which comprises a swing angle sensor, a memory 5, which may also be part of the control unit 1, and operating units or elements 6, which are disposed, for example, in the passenger compartment, on the tailgate, or on a portable remote control. The controlled fluid drive includes a hydraulic group 2.1 and a hydraulic cylinder 2.2. The uncontrolled fluid drive includes a pair of gas springs 2.3 and 2.4.

Figure 2:
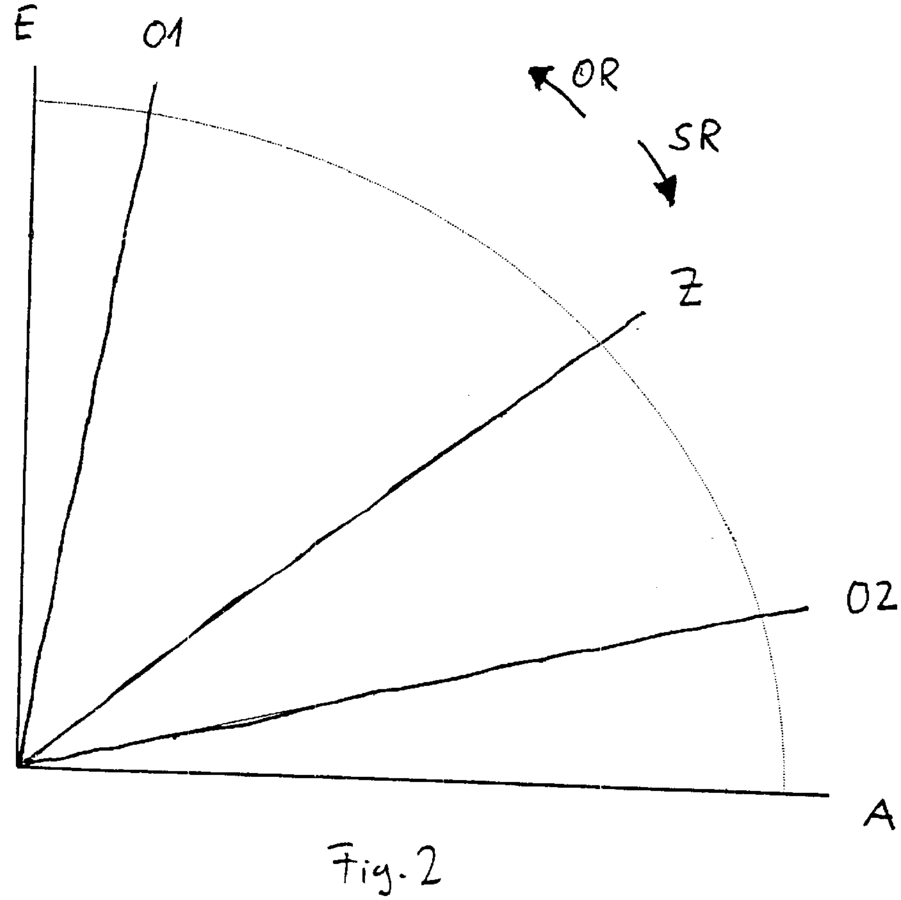
FIG. 2 is a diagrammatic illustration of a control sequence for the tailgate.

FIG. 2 shows a diagrammatic illustration of a control sequence for the tailgate 3. When an opening command is passed to the control unit 1 via operating units 6 the control unit 1 switches on the controlled fluid drive 2.1, 2.2 so that the tailgate 3 is moved from its starting position towards an end position E. This is illustrated in the diagram by the opening direction arrow OR. When a first angle of opening O1, predetermined by the vehicle manufacturer and stored in the memory 5, is reached, the control unit switches off the hydraulic group 2.1. For the final movement phase of the opening movement between the first predetermined angle of opening O1 and the end position E, the tailgate 3 continues to be driven only by the pair of gas springs 2.3, 2.4. The hydraulic cylinder 2.2 is released in this phase so that the piston rod is entrained further in the opening direction by the drive lever 7.

In the event of a closing command, which is again transmitted to the control unit 1 via the operating elements 6, the control unit 1 switches on the hydraulic group 2.1 again, and the hydraulic cylinder 2.2 is subjected to pressure in the reverse operating direction. To this end, the control unit 1 activates corresponding fluidic switching elements such as, for example, multiport valves. The tailgate 3 is driven from its end position E towards its starting position A. This is illustrated in the diagram by the closing direction arrow SR. When a second angle of opening O2, predetermined by the manufacturer and also stored in the memory 5, is reached, the control unit 1 switches off the hydraulic group 2.1 again. In the last phase of the closing movement between the second predetermined angle of opening O2 and the starting position A, only the spring force of the pair of gas springs 2.3, 2.4 continues to act against the action of gravity on the tailgate 3. The spring force of the pair of gas springs 2.3, 2.4, however, is dimensioned so that the action of gravity on the tailgate 3 is sufficient to reach the starting position A. The hydraulic cylinder 2.2 is likewise released in this phase, similarly to the case of the opening movement, so that the rod head is moved further in the closing direction by the drive lever 7.

In addition to the angles of opening described, other angles of opening for an intermediate position can also be programmed, for example by the user. Such an angle of opening Z is shown in the diagram, this angle representing the limitation of the angle of opening in order to prevent a collision with a removable roof superstructure such as a ski box or a surfboard. If such an angle of opening for an intermediate position is stored in the memory 5, an opening operation of the tailgate is stopped when this angle of opening Z is reached. The programming of the angle of opening takes place via an input system in the passenger compartment or through a special actuation sequence of the operating elements. Thus, the programming operation can be performed, for example, by actuating a particular operating element for a predetermined period of time (e.g. 5 seconds), and then opening the tailgate until the desired angle of opening is reached and again actuating the operating element for a predetermined period of time to transfer the desired angle of opening into the memory. In addition, desired angles of opening may be input into the memory 5 in the workshop via a programming appliance that is connected to the vehicle bus.

In order to detect whether a predetermined angle of opening has been reached, the control unit 1, at regular intervals, compares the start signals of the sensor unit 4, which correspond to the current angle of opening, with the stored angles of opening. In the event of coincidence, a controlled drive is then switched off, or the movement of the motor vehicle panel is stopped.

Figure 3:
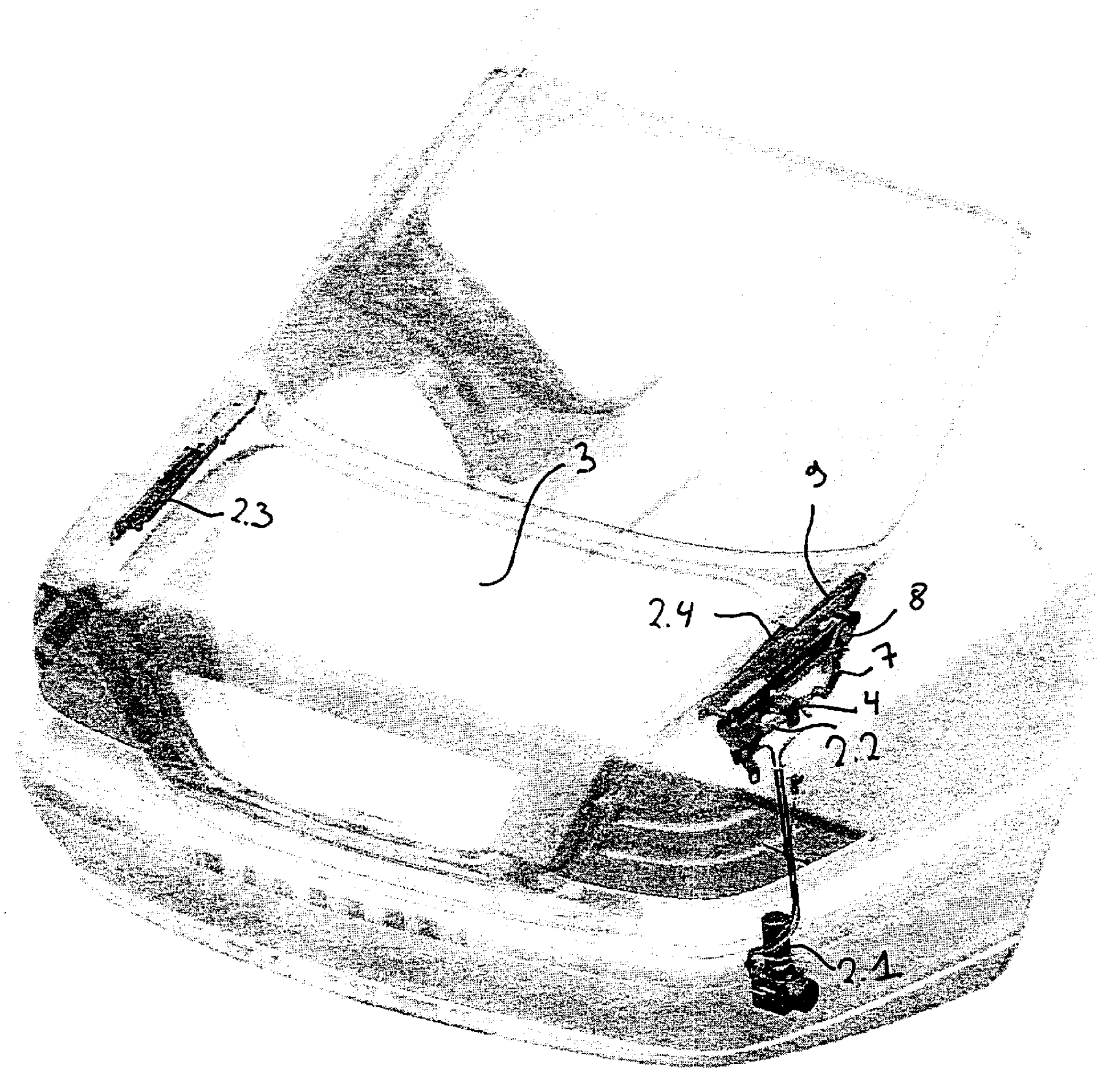
FIG. 3 is a perspective rear view of a motor vehicle with an actuating arrangement for a tailgate.

As can be seen from FIG. 3, the controlled fluid drive includes a hydraulic group 2.1, a hydraulic cylinder 2.2, and a drive lever 7, and is located in the right-hand side region of the luggage compartment. The drive force of the hydraulic cylinder 2.2 is transmitted via the drive lever 7 and a shaft 8 to a lever of the right-hand multi-joint hinge 9. The drive lever 7 is connected in an articulated manner to the rod head of the hydraulic cylinder 2.2. The tailgate 3 is mounted via the multi-joint hinges 9 on the bodywork so as to be capable of swinging about a horizontal transverse axis of the vehicle. One uncontrolled fluid drive 2.3, 2.4 on each side of the tailgate 3 at the multi-joint hinges 9 relieves the load on the tailgate 3. The uncontrolled fluid drives 2.3, 2.4 are gas springs 2.3, 2.4 and are arranged with mirror-image symmetry in, respectively, the right-hand and left-hand water drainage channels. FIG. 3 shows the tailgate in its starting position A (closed).

Figure 4:
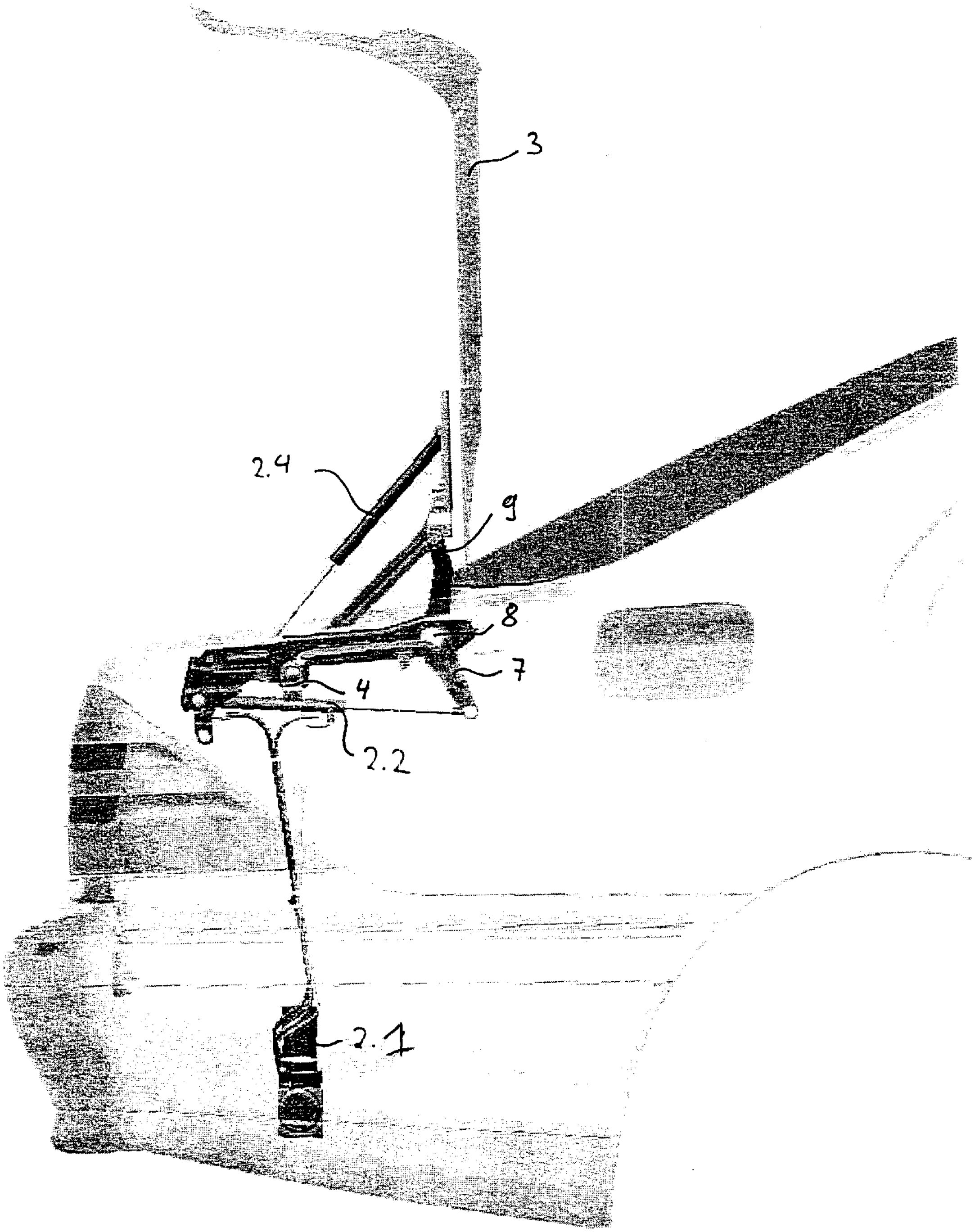
FIG. 4 is a side view of the actuating arrangement with the tailgate opened.

FIG. 4 shows the tailgate 3 in its end position E (completely opened). The telescopic rods of the gas springs 2.3, 2.4, serving as uncontrolled fluid drives, are shown in the fully extended position. In this fully extended position, the gas springs 2.3, 2.4 limit the maximum possible angle of opening E of the tailgate and form the stop.

Figure 5:
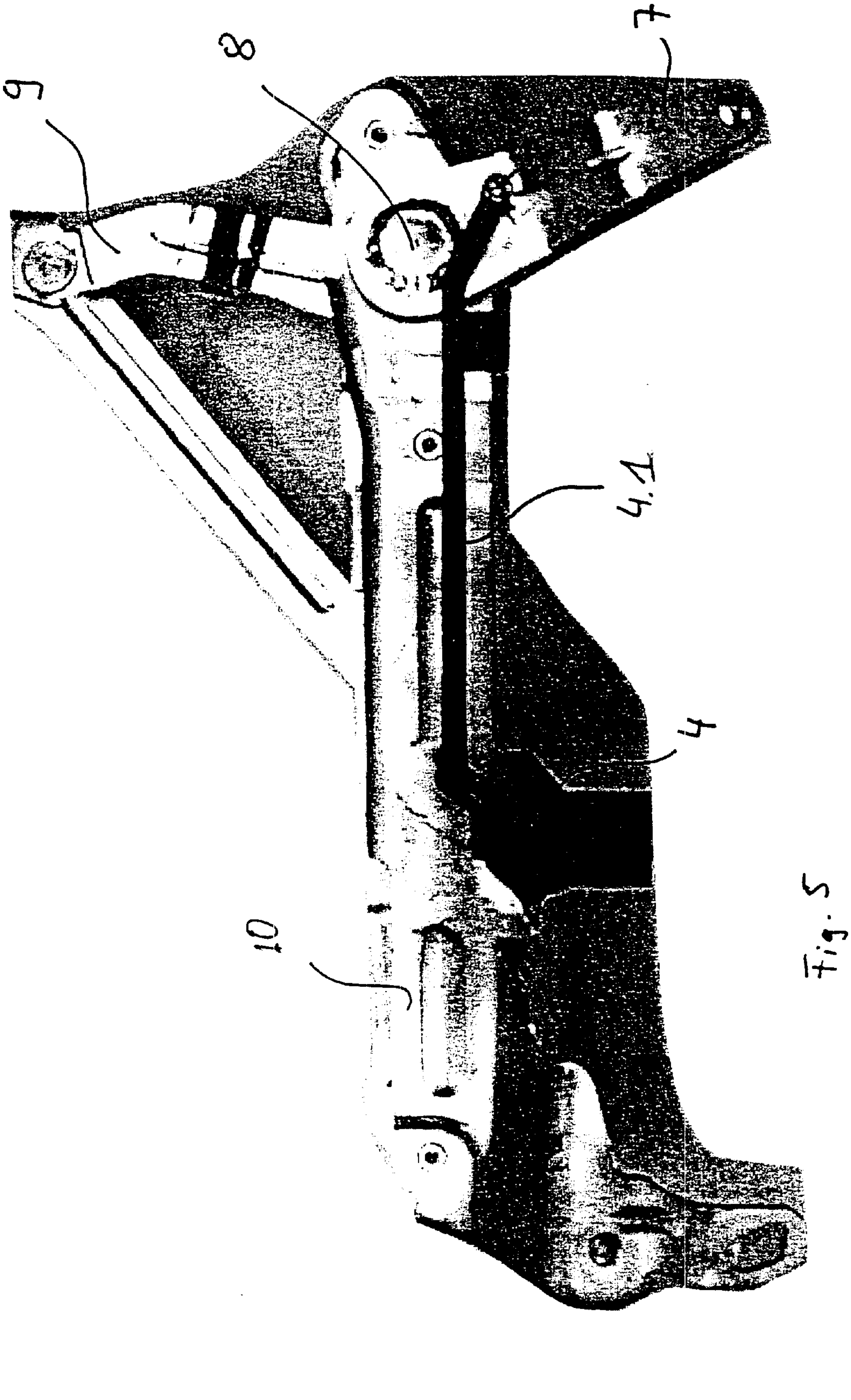
FIG. 5 is a side view of the actuating arrangement on a larger scale.

FIG. 5 shows the arrangement of the swing angle sensor 4 on the hinge support 10. The swing angle sensor 4 is connected via a coupling rod 4.1 to the drive lever 7 in order to detect its position continuously and pass it on to the control unit 1. The control unit 1 evaluates these current angles of opening and compares them with the stored predetermined angles of opening. In addition, the control unit 1 determines a current change in the angle of opening and compares this with the normal change of angle of opening, which depends on the duration of the opening or closing movement. If no change in the angle of opening is detected within a predetermined time window (e.g. 100 ms), the control unit concludes that an obstacle exists in the direction of movement of the tailgate 3 and stops the opening operation. The direction of movement of the tailgate 3 is then reversed, and movement is performed until the start position of the interrupted closing or opening movement is reached.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. An actuating arrangement for opening and closing a hinged motor vehicle panel comprising:

a fluid drive, a control unit, and a sensor unit, wherein the hinged motor vehicle panel is movable between a starting position and an end position, wherein the control unit evaluates start signals from the sensor unit and stops movement of the motor vehicle panel in an intermediate position when certain criteria are met, wherein the start signals from the sensor unit correspond to current angles of opening of the hinged motor vehicle panel, wherein at least one intermediate position of the hinged motor vehicle panel, during a closing or opening movement, is defined by a predetermined angle of opening, wherein the predetermined angle of opening is stored and individually programmable, wherein the sensor unit comprises a swing angle sensor which detects a current angle of opening of the motor vehicle panel and passes a corresponding start signal to the control unit, and wherein the current angle of opening of the motor vehicle panel is detected from a position of a drive lever, and wherein the drive lever is connected, in a manner fixed in rotation, to a lever of a hinge of the motor vehicle panel.

2. An actuating arrangement for opening and closing a hinged motor vehicle panel comprising:

a fluid drive, a control unit, and a sensor unit, wherein the hinged motor vehicle panel is movable between a starting position and an end position, wherein the control unit evaluates start signals from the sensor unit and stops movement of the motor vehicle panel in an intermediate position when certain criteria are met, wherein the start signals from the sensor unit correspond to current angles of opening of the hinged motor vehicle panel, wherein at least one intermediate position of the hinged motor vehicle panel, during a closing or opening movement, is defined by a predetermined angle of opening, wherein the predetermined angle of opening is stored and individually programmable, and wherein the fluid drive comprises a controlled fluid drive and the control unit compares a detected current angle of opening of the motor vehicle panel with the predetermined angle of opening and switches off the controlled fluid drive in the event of coincidence.

3. An actuating arrangement for opening and closing a hinged motor vehicle panel comprising:

a fluid drive, a control unit, and a sensor unit, wherein the hinged motor vehicle panel is movable between a starting position and an end position, wherein the control unit evaluates start signals from the sensor unit and stops movement of the motor vehicle panel in an intermediate position when certain criteria are met, wherein the start signals from the sensor unit correspond to current angles of opening of the hinged motor vehicle panel, wherein at least one intermediate position of the hinged motor vehicle panel, during a closing or opening movement, is defined by a predetermined angle of opening, wherein the predetermined angle of opening is stored and individually programmable, and wherein the predetermined angle of opening is programmable by the user.

4. The actuating arrangement according to claim 1, wherein the control unit evaluates a current change in an angle of opening in relation to a normal change in the angle of opening, the normal change in the angle of opening being dependent on a duration of the opening or closing movement.

5. The actuating arrangement according to claim 1, wherein the control unit automatically triggers an opening movement of the motor vehicle panel when a keyless go card is detected in the luggage compartment and the motor vehicle panel is being closed.

6. The actuating arrangement according to claim 1, wherein movement of the motor vehicle panel is stopped by the control unit when no change in an angle of opening is detected within a predetermined time window.

7. The actuating arrangement according to claim 6, wherein the control unit drives the controlled fluid drive in a reverse direction of movement after stopping movement of the motor vehicle panel.

8. The actuating arrangement according to claim 7, wherein the reverse direction of movement of the motor vehicle panel is stopped after the original starting position of the motor vehicle panel is reached.

9. The actuating arrangement according to claim 2, wherein movement of the motor vehicle panel is stopped by the control unit when no change in an angle of opening is detected within a predetermined time window.

10. The actuating arrangement according to claim 9, wherein the control unit drives the controlled fluid drive in a reverse direction of movement after stopping movement of the motor vehicle panel.

11. The actuating arrangement according to claim 10, wherein the reverse direction of movement of the motor vehicle panel is stopped after the original starting position of the motor vehicle panel is reached.

12. The actuating arrangement according to claim 3, wherein movement of the motor vehicle panel is stopped by the control unit when no change in an angle of opening is detected within a predetermined time window.

13. The actuating arrangement according to claim 12, wherein the control unit drives the controlled fluid drive in a reverse direction of movement after stopping movement of the motor vehicle panel.

14. The actuating arrangement according to claim 13, wherein the reverse direction of movement of the motor vehicle panel is stopped after the original starting position of the motor vehicle panel is reached.

15. A process of opening and closing a hinged motor vehicle panel comprising:

moving the hinged motor vehicle panel between a starting position and an end position, evaluating start signals corresponding to current angles of opening of the motor vehicle panel and stopping movement of the motor vehicle panel in an intermediate position when certain criteria are met, defining at least one intermediate position of the hinged motor vehicle panel, during a closing or opening movement, by a predetermined angle of opening, storing the predetermined angle of opening, and automatically triggering an opening movement of the motor vehicle panel when a keyless go card is detected in a luggage compartment and the motor vehicle panel is being closed.

16. The process according to claim 15, and further comprising individually programming the predetermined angle of opening.

17. The process according to claim 15, and further comprising evaluating a current change in an angle of opening in relation to a normal change in the angle of opening which is dependent on a duration of the opening or closing movement.

18. The process according to claim 15, and further comprising stopping movement of the motor vehicle panel when no change in an angle of opening is detected within a predetermined time window.

19. The actuating arrangement according to claim 2, wherein the control unit evaluates a current change in an angle of opening in relation to a normal change in the angle of opening, the normal change in the angle of opening being dependent on a duration of the opening or closing movement.

20. The actuating arrangement according to claim 3, wherein the control unit evaluates a current change in an angle of opening in relation to a normal change in the angle of opening, the normal change in the angle of opening being dependent on a duration of the opening or closing movement.

21. The actuating arrangement according to claim 2, wherein the control unit automatically triggers an opening movement of the motor vehicle panel when a keyless go card is detected in the luggage compartment and the motor vehicle panel is being closed.

22. The actuating arrangement according to claim 3, wherein the control unit automatically triggers an opening movement of the motor vehicle panel when a keyless go card is detected in the luggage compartment and the motor vehicle panel is being closed.

* * * * *